Sept. 15, 1936.  E. H. WAUGH  2,054,576
FISH CLEANING WHEEL
Filed Nov. 17, 1934    3 Sheets-Sheet 1
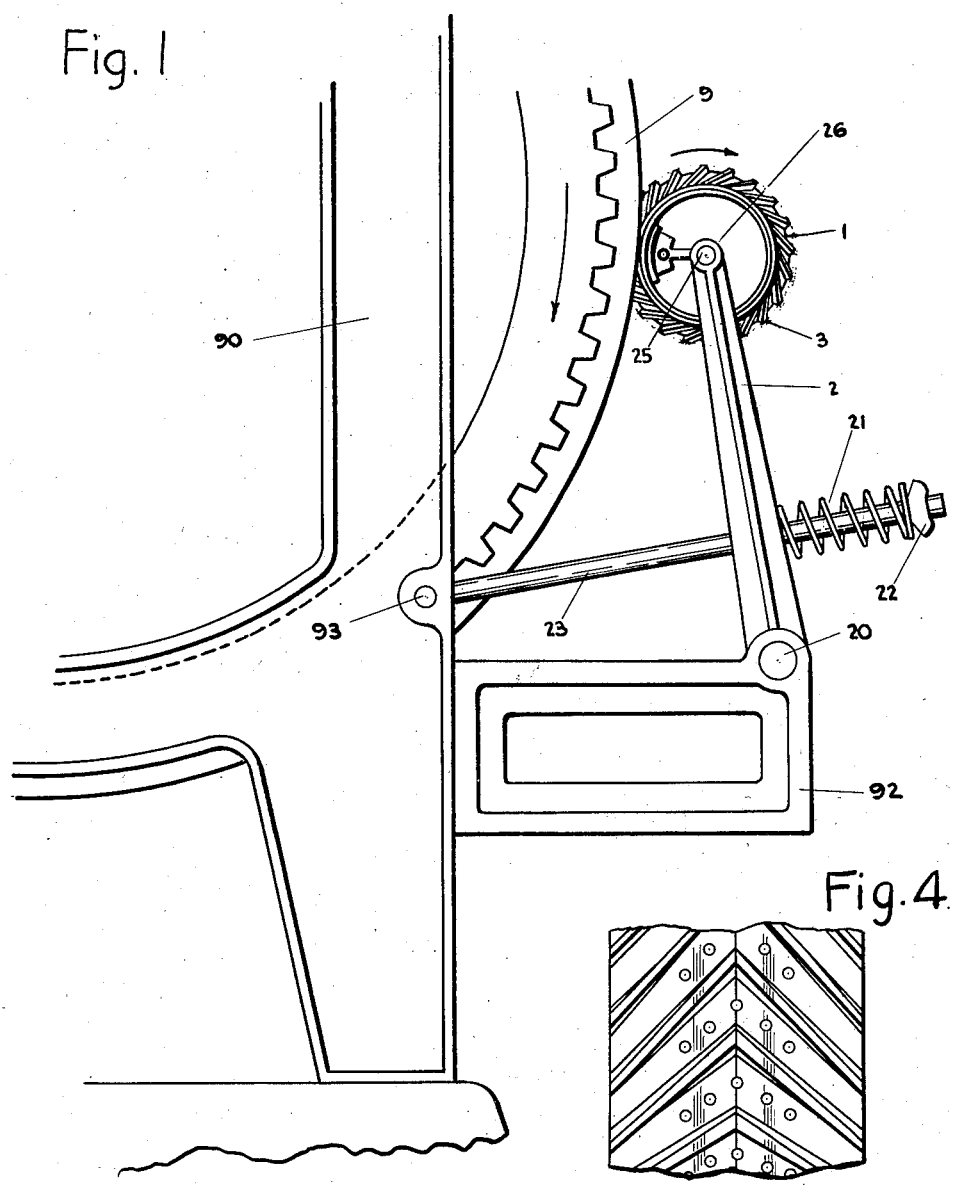
Fig. 1
Fig. 4
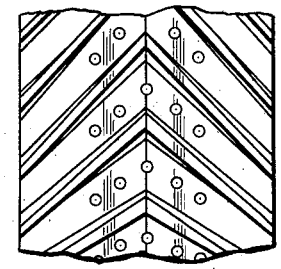
Inventor
Edward H. Waugh
By *Charles L. Reynolds*
Attorney Patented Sept. 15, 1936

2,054,576

UNITED STATES PATENT OFFICE 2,054,576

FISH-CLEANING WHEEL

Edward H. Waugh, Seattle, Wash., assignor to Smith Cannery Machines Company, Seattle, Wash., a corporation of Washington Application November 17, 1934, Serial No. 753,480

22 Claims. (Cl. 17—3)

My invention relates generally to fish cleaning machines, and more particularly to machines of the type known as the "Iron chink", in which a fish is moved through a fixed path, and in succession, among other operations, has its belly slit open, its sides spread open, and the entrails cleaned from the cavity.

It is a particularly difficult operation to quickly and thoroughly cleanse the cavity, to remove all the entrails and to deposit and collect the removed entrails, and to remove the blood clot or sack running along the base of the backbone within the cavity. The primary object of my invention, therefore, is to provide a device for use in such machines which will more efficiently and thoroughly perform the various functions referred to above.

It is an object to provide such cleaning means which, though more efficient, are less likely to damage the fish than means heretofore employed, and which will be more substantial and slower to wear out than previous devices.

It is a particular object to provide, for loosening or removing entrails by itself, or in conjunction with such a mechanical cleaning device as previously mentioned, means to efficiently direct and employ jets or streams of water upon the fish. If such water discharge means are employed with the mechanical means, it is a further object to effect discharge of water in the vicinity of the area of greatest contact between the cleaning device and the fish, thus to assist in dislodging and removing the entrails, to prevent clogging of the cleaning device, and to assist in the collection, deposition and disposal of the entrails, and in conjunction with either of the objects just mentioned, it is a further object to provide such means which can be adjusted for most efficient operation in accordance with various factors, such as the speed of operation of the cleaning machine, the water pressure head available, and the character and condition of the fish.

Almost all spent salmon have sides which are thin and flabby, and this is true in greater or lesser degree in other salmon and in other fish, and it is a problem to hold their sides apart while brushes or other cleaning devices operate within the cavity. The edges tend to curl under. A further object, therefore, is to provide a cleaning device so formed and shaped that it will automatically hold the sides open and against the bull ring behind them, and will eliminate curling at the edges.

It is a further object to provide such a cleaning device having the advantages mentioned, which will be simple and inexpensive to make, and which, being less likely to wear out, will enable the entire machine to continue operations with fewer interruptions.

With these and other objects in view, as will appear as the specification progresses, my invention comprises the novel cleaning device, and the novel arrangement and combination thereof with other parts of a fish cleaning machine, all as shown in the accompanying drawings, and as will be described in this specification and more particularly pointed out by the claims which terminate the same.

In the accompanying drawings I have shown my invention embodied in a form which at present is preferred by me, it being understood that various changes may be made in the form, size, and arrangement of the various elements without departing from the spirit and scope of my invention.

Figure 1 is a fragmentary elevation of a fish cleaning machine of the type indicated, illustrating my cleaning device associated therewith.

Figure 4 is an elevation taken at right angles to that of Figure 3.

Figure 2:
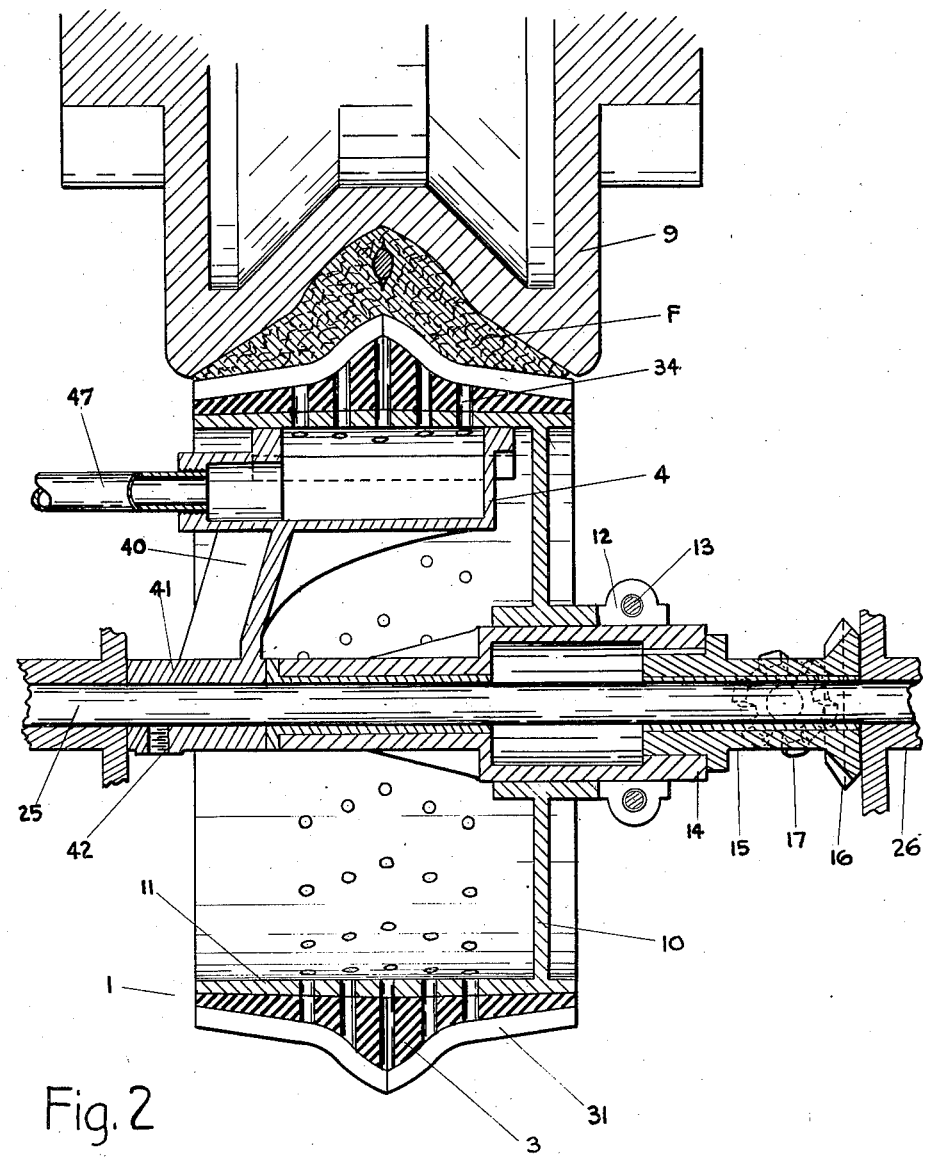
Figure 2 is an axial section through the cleaning device and the associated portion of the fish cleaning machine, illustrating the manner of operation.
Figure 3:
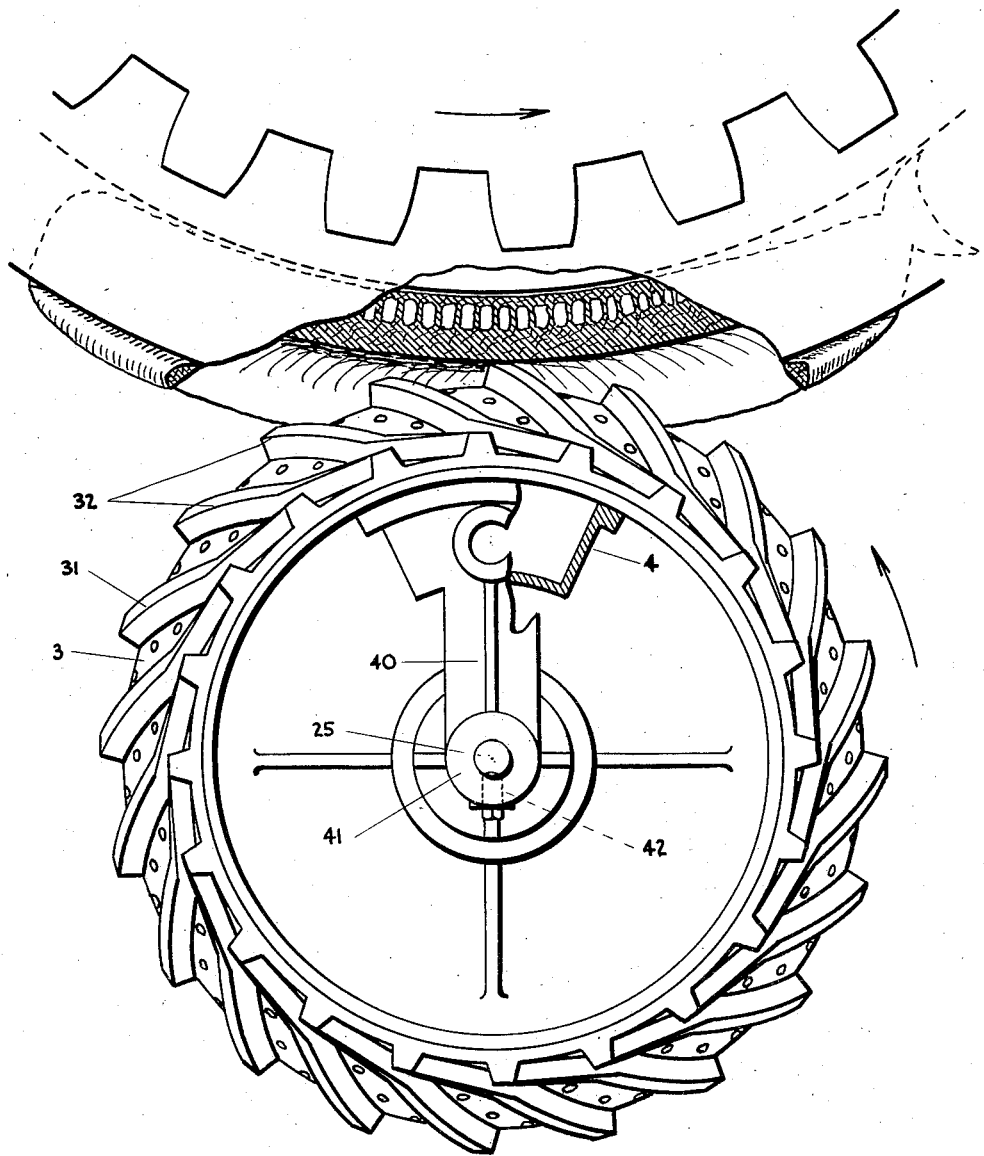
Figure 3 is a side elevation of the same, with parts broken away.

Such a fish dressing machine comprises generally a frame 90, in which a bull ring 9 is supported for rotation to advance a fish held in the bull ring (by means which are not shown) through a definite path. Along this path are the various operating means, but as machines of this type are well known in the art I have not illustrated any operating means other than the cleaner 1. Such a cleaner may be conveniently supported from arms 2 fulcrumed at 20 upon an extension frame 92, and the cleaner may be urged toward the bull ring and toward a fish carried upon the bull ring, by a spring 21 acting upon the arms 2 from a washer or head 22 upon the end of a rod 23, anchored in the frame at 93.

The cleaner includes a wheel 10 which preferably has a rim 11 of substantially cylindrical shape. The wheel may be provided with a split hub 12, which by means of clasp screws 13 enable it to be clamped upon a rotative sleeve 14, to which is keyed or otherwise secured a driving member 15 carrying the gear 16 with which meshes a drive gear 17. The drive shaft (not shown) upon which the gear 17 is mounted may conveniently extend along the arms 2, so that there may be a positive drive of the wheel 1 regardless of the swinging of the arms 2 upon their pivots 20. The entire drive arrangement and the wheel may conveniently be mounted upon a spindle 25, held in suitable bearings 26 at the swinging end of the arms 2.

While the rim 11 of the wheel 10 is preferably cylindrical, at least upon its inner surface, it is preferred that the periphery of the wheel be shaped to fit within the cavity of a fish F spread out upon the bull ring 9, and also that it be of a somewhat yielding character, particularly in order to accommodate local irregularities of surface, though having comparatively sharp edges and a point which will effectively engage the entrails, and particularly the blood clot referred to, to remove them. These characteristics can not be reasonably well attained if the periphery of the wheel is of metal or any hard substance, and because of the surface shape of the wheel the cost of a metal wheel would be prohibitive. I have found that these advantages and others, as cheapness, can be obtained if the periphery of the wheel be of rubber or like yieldable material. In consequence I form the periphery of the wheel of a mass of rubber, indicated at 3, in the form of an annulus, rising from each edge to a peripheral peak, so as to fit within the cavity of the fish, and having a series of herringbone-shaped ribs 31, with their angles coinciding with the peak of the annulus 3, and their arms parallel and diverging from the angle rearwardly, with respect to the direction of rotation of the wheel, toward each edge of the annulus. Thus as the wheel rotates, there first comes into contact with the cavity of the fish the point of each V-shaped groove, after which the side edges contact with the walls of the cavity, and serve to spread it open and to hold the sides back against the bull ring; the point of the V clears away the clot along the backbone, and the entrails are scraped away from the inside of the cavity and removed by the advancing comparatively sharp edge 32 of each successive rib. By reason of its elasticity the annulus 3 and the preferably integral ribs 31 will yield to accommodate irregularities or variations in the surface, shape, and thickness of the fish, and yielding will also be permitted by means of the spring 21, yet it will tend to cling closely to the walls of the fish's cavity, and to clean it thoroughly, but without any breaking or tearing action.

To assist the action of the ribs to loosen the entrails, to collect them, and to assist in their disposal, and to clean out particles which may not be scraped off by the ribs, I provide means to discharge jets of water centrifugally in the vicinity of the ribs when they are in contact with the inside of the fish's cavity. To this end I provide a water reservoir 4, carried upon an arm 40 which is mounted by means of a sleeve 41 upon the spindle 25. A set screw 42 enables the reservoir 4 to be shifted, either axially or angularly with respect to the spindle 25. It is the angular adjustment with which I am chiefly concerned.

Water is supplied to the reservoir 4 by suitable means, such as the hose or pipe 47. The reservoir is open at its outer face and lies closely adjacent to the inner face of the rim 11, though not necessarily in rubbing contact therewith. The rim 11 and the annulus 30 are provided with a series of apertures 34 which, when in communication with the reservoir 4, pick up water from the reservoir and throw it by centrifugal force outwardly to the outer periphery of the annulus 3. These apertures preferably discharge between adjacent ribs. The force of these jets is a very considerable factor in loosening and removing the entrails, so much so that they may in some cases be considered the primary removing means, or equal in effectiveness to the ribs. However, the ribs are usually necessary, in order to scrape the cavity clean, and particularly to scrape out the blood clot. The V-shape of the ribs is important to this latter function, the point of each V digging down to the base of the slot and tearing it loose.

If the factors of speed and water pressure were constant there might be no necessity for adjustment of the position of the reservoir 4. The factor of pressure, in particular, varies in different installations. By proper positioning of the reservoir 4 angularly about the spindle 25 it will be evident that the point of discharge of water can be precisely controlled, regardless of the water pressure, and that the location of the point and direction of discharge will be to a large extent a function of the rate of speed of the wheel 1, the water pressure, and the angular position of the reservoir about the spindle. Preferably the rate of speed is in the neighborhood of 900 revolutions per minute. The water is thus discharged with considerable force, serving or helping to clean the surface of the cavity, assisting also in keeping the cleaning wheel free from any accumulation of entrails, and assisting in the disposal of the entrails.

The wheel 1, as a whole, is adjustable axially of the spindle 25 by loosening the clamp screws 13, and shifting the wheel lengthwise of the sleeve 14. This adjustment would be principally necessary to align the wheel, particularly the peripheral peak thereof, properly with respect to the bull ring 9. While the reservoir 4 is also adjustable axially of the spindle, the adjustment angularly is principally employed, and this for the purpose of controlling the point and direction of delivery of the water through the apertures.

While I have described the annulus 3 as formed of rubber and the ribs 31 as integral therewith, it will be evident that the ribs alone might be of rubber, or that the ribs might be resiliently supported by means other than a rubber annulus beneath them, and indeed, if the ribs are resiliently supported, they might be of material other than rubber. However, rubber is the preferred material, since it will accommodate itself to local irregularities, will provide a firm grip, yet without tearing or injuring the fish, and it is tough and resistant to wear and cheap to manufacture. Such machines are generally used in remote places where it is difficult to secure repair parts, and where the machine must be kept in continuous operation during a run; consequently it must be free from trouble in the greatest degree.

What I claim as my invention is:

1. A fish cleaning device comprising a rotatable wheel having a plurality of yieldable aligned V-shaped ribs supported on the wheel and disposed transversely of its periphery, the peripheral surfaces of said ribs being adapted to yield circumferentially upon engagement with the fish.

2. A fish cleaning device comprising a rotatable annulus of rubber having a plurality of aligned V-shaped ribs disposed transversely of its periphery, of a length to engage substantially the entire width of the inside of a fish.

3. A fish cleaning device comprising a rotatable wheel having a rim of rubber generally shaped to scrape the inside of a fish, and having a plurality of integral V-shaped ribs disposed transversely of its periphery, of a length to scrape the inside of a fish from side to side and with their angles aligned peripherally in a position to remove the blood clot along the backbone.

4. A fish cleaning device comprising a rotatable wheel having a plurality of aligned V-shaped flat-topped ribs disposed transversely of its periphery, and yieldably supported from the wheel, the advancing edges of said ribs, with respect to the direction of rotation of the wheel making a sharp angle with the tops, and being generally shaped to scrape the inside of a fish.

5. A fish cleaning device comprising a rotatable wheel having a plurality of aligned V-shaped ribs disposed transversely of its periphery, and a plurality of apertures arranged between and alternately with said ribs in V-shaped rows parallel to the ribs, and means to deliver water through the apertures centrifugally upon a fish with which the wheel is engaged.

6. A fish cleaning device comprising a rotatable wheel having a plurality of spaced scraper elements disposed transversely of its periphery, a stationary water reservoir inside and disposed adjacent to the wheel's periphery, and the wheel having apertures leading from such reservoir to the spaces between the scraper elements, for the centrifugal discharge of water upon a fish in contact with the wheel.

7. A fish cleaning device comprising a rotative substantially cylindrical wheel, an annulus of rubber mounted upon the wheel, having side portions sloping gently centrally and outward from each edge of the wheel and in the center rising steeply to a peak to conform generally to the shape of an outspread fish, a plurality of flat-topped rubber ribs of generally V-shape upstanding from said annulus, each with its angle at the peak thereof, and its arms extending towards the edges thereof, the top of each rib meeting the obtuse angled side in a sharp edge to scrape a fish presented thereto.

8. A fish cleaning device comprising means to support a fish with its sides spread apart into nearly coplanar relation and its cavity outermost, a plurality of generally V-shaped parallel rubber ribs shaped to fit the cavity of the fish when thus spread apart over substantially its entire width, and means to effect rapid relative movement of the fish and said ribs, to scrape the cavity.

9. A fish cleaning device comprising means to support a fish with its sides spread apart into nearly coplanar relation and its cavity outermost, a plurality of generally V-shaped parallel rubber ribs shaped to fit the cavity of the fish, means to effect rapid relative movement of the fish and said ribs, to scrape the cavity, and means to discharge water within the cavity in the immediate vicinity of the ribs engaged with the fish and during such engagement.

10. A fish cleaning device comprising means to support a fish with its sides spread apart into nearly coplanar relation and its cavity outermost, a plurality of generally V-shaped parallel rubber ribs shaped to fit the cavity of the fish, and means to effect rapid movement of the ribs relative to the fish, to scrape the cavity, and means associated with, and operable by movement of, the ribs to deliver water within the cavity in the immediate vicinity of the ribs engaged with the fish and during such engagement.

11. In a fish dressing machine, in combination with fish supporting means operable to advance a fish, with its cavity spread open, through a fixed path, rotative means disposed adjacent such path and engageable within the cavity to clean it, a non-rotative water reservoir disposed within the rotative cleaner means, the latter having apertures adapted to communicate with said reservoir, and means to rotate the cleaner means at a speed to discharge water centrifugally through such apertures, within the cavity adjacent to the cleaner means.

12. In a fish dressing machine, in combination with fish supporting means operable to advance a fish, with its cavity spread open, through a fixed path, a scraper wheel disposed adjacent such path, means to rotate said wheel, and a plurality of rubber ribs disposed about the periphery of such wheel and shaped to engage the inside of the cavity, each of said ribs having two linear angularly disposed side portions diverging rearwardly with respect to the direction towards which the wheel rotates, and sloping gently centrally and outward, and each rib having an outwardly projecting central peak faired into said side portions.

13. In a fish dressing machine, in combination with fish supporting means operable to advance a fish, with its cavity spread open, through a fixed path, rotative means disposed adjacent such path and engageable within the cavity to clean it, a water reservoir disposed within the rotative cleaner means, the latter having apertures adapted to communicate with said reservoir, means to rotate the cleaner means at a speed to discharge water centrifugally through such apertures, within the cavity adjacent to the cleaner means, and means to adjust the water reservoir to change the position of the water reservoir angularly about the axis of rotation of the cleaner means, to control the point of delivery of the water.

14. In a fish dressing machine, in combination with fish supporting means operable to advance a fish, with its cavity spread open, through a fixed path, a spindle, a wheel having a substantially cylindrical rim rotatably mounted upon said spindle, and disposed adjacent to such path, a water reservoir likewise mounted upon and adjustable angularly about said spindle, and opening beneath the rim of the wheel, in close contact therewith, cleaner means carried outside the rim to engage within the cavity of fish advancing along such path, said rim having apertures adapted successively to pass the open side of the reservoir, as the wheel rotates, and means to rotate the wheel rapidly to effect centrifugal delivery of water from the reservoir through the apertures upon the fish as it passes.

15. A fish cleaning machine comprising means to advance a fish, with its belly slit open, through a definite path, and means disposed along said path to discharge jets of water only in the direction of and upon the fish, with sufficient force to loosen the entrails.

16. A fish cleaning machine comprising means to advance a fish, with its belly slit open, through a definite path, a water supply source, and means disposed along said path and in communication with said water supply source, said last-mentioned means being rotative at a speed to discharge water centrifugally only in the direction of and within the cavity, with sufficient force to loosen the entrails.

17. A fish cleaning machine comprising means to advance a fish, with its belly slit open, through a definite path, means disposed along said path to direct jets of water only towards and upon the fish, with sufficient force to loosen the entrails, and means to scrape the entrails from the fish.

18. A fish cleaning machine comprising means to advance a fish, with its belly slit open, through a definite path, means disposed along said path to direct jets of water only towards and upon the fish, with sufficient force to loosen the entrails, and means formed upon said latter means to scrape the loosened entrails from the fish.

19. A fish cleaning machine comprising means to advance a fish, with its belly slit open, through a definite path, means disposed along said path to discharge jets of water directed only towards and upon the fish, with sufficient force to loosen the entrails, and means associated with said latter means to mechanically remove the blood clot along the backbone.

20. The method of cleaning fish which includes the step of discharging water centrifugally, at high speed, and only in the direction of and within the cavity of the fish, by impingement of such water to loosen the entrails.

21. In a fish dressing machine, in combination with means to support a fish, with its cavity spread open to a substantially flat position, and to advance it through a fixed path, means disposed adjacent to such path and engageable within the cavity to clean it, said means being formed to engage the spread-open fish substantially from side to side and to apply a force to each side of the fish outwardly from its backbone and rearwardly in the direction of relative movement of the fish and said cleaning means, to maintain such sides spread open.

22. In a fish dressing machine, in combination with means to support a fish, with its cavity spread open, and to advance it through a fixed path, rotative means disposed adjacent such path and engageable within the cavity to clean it, said means having successive cleaning elements disposed in lines, at each side of the fish's backbone, extending outwardly to the edge of the fish's side, and rearwardly in the direction of rotation of the cleaning means, and means urging said rotative means toward the fish supporting means to press the fish's sides against the fish supporting means, and to maintain them spread open.

EDWARD H. WAUGH.

DISCLAIMER 2,054,576.—*Edward H. Waugh*, Seattle, Wash. FISH-CLEANING WHEEL. Patent dated September 15, 1936. Disclaimer filed January 2, 1937, by the assignee, *Smith Cannery Machines Company*.

Hereby enters this disclaimer to claims 21 and 22, namely:

From each of claims 21 and 22 any structure wherein the means engageable within the cavity of the fish to clean it is not yieldable; that is to say, in order to come within the intended scope of claims 21 and 22 such means must be itself of yieldable material or so mounted with respect to its support as to yield while in engagement with a fish when acted upon by a force created by relative movement between said means and the fish.

[*Official Gazette January 26, 1937.*]